US007808561B2

(12) United States Patent
Lee et al.

(10) Patent No.: US 7,808,561 B2
(45) Date of Patent: Oct. 5, 2010

(54) APPARATUS AND METHOD FOR TRANSFORMING A DIGITAL TV BROADCASTING SIGNAL TO A DIGITAL RADIO BROADCASTING SIGNAL

(75) Inventors: Hyun Lee, Daejon (KR); Gwang-Soon Lee, Daejon (KR); Kyu-Tae Yang, Daejon (KR); Bong-Ho Lee, Daejon (KR); Young-Kwon Hahm, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 792 days.

(21) Appl. No.: 10/584,419

(22) PCT Filed: Oct. 12, 2004

(86) PCT No.: PCT/KR2004/002601

§ 371 (c)(1), (2), (4) Date: Jun. 4, 2007

(87) PCT Pub. No.: WO2005/064936

PCT Pub. Date: Jul. 14, 2005

(65) Prior Publication Data

US 2007/0242701 A1 Oct. 18, 2007

(30) Foreign Application Priority Data

Dec. 26, 2003 (KR) ...................... 10-2003-0097822
Jun. 30, 2004 (KR) ...................... 10-2004-0050464

(51) Int. Cl.
*H04N 5/38* (2006.01)

(52) U.S. Cl. ...................................................... 348/723

(58) Field of Classification Search ................. 348/725, 348/723, 729, 441; 375/240.01, 240.26, 375/240.18
See application file for complete search history.

(56) References Cited

U.S. PATENT DOCUMENTS 5,584,051 A 12/1996 Goken (Continued)

FOREIGN PATENT DOCUMENTS

CN 1088962 C 8/2002

(Continued)

OTHER PUBLICATIONS

"A DAB Transmitter Prototype with High flexibility and Low Cost" by Chunsheng Liu et al.; *IEEE Transactions on Broadcasting*; Sep. 2002; vol. 48 No. 3.

*Primary Examiner*—M. Lee
(74) *Attorney, Agent, or Firm*—Blakely, Sokoloff, Taylor & Zafman

(57) ABSTRACT

The present invention relates to an apparatus for transforming digital TV broadcasting signals into digital radio broadcasting signals and a method thereof. The apparatus includes: a transport stream generator for transforming TV broadcasting signals outputted from outside into digital TV broadcasting transport streams; a broadcasting transport format transformer for generating digital radio broadcasting transport streams by transforming the digital TV broadcasting transport streams in conformity to a digital radio broadcasting transport protocol based on a radio broadcasting schedule; a digital radio broadcasting multiplexer for multiplexing the generated digital radio broadcasting transport streams generated in the broadcasting transport format transformer; a modulating/up-converting unit for modulating the multiplexed digital radio broadcasting transport streams in a modulation method of digital radio broadcasting and up-converting frequencies of the modulated radio broadcasting signals into radio frequency (RF) signals; and a high-power amplifier for amplifying and transmitting the up-converted RF signals through a transmitting antenna.

13 Claims, 7 Drawing Sheets

U.S. PATENT DOCUMENTS

| | | | |
|---|---|---|---|
| 6,249,514 B1 | 6/2001 | Campanella | |
| 6,266,813 B1 | 7/2001 | Ihara | |
| 2003/0081686 A1 | 5/2003 | Jung et al. | |
| 2004/0096003 A1 * | 5/2004 | Horn | 375/240.28 |
| 2006/0262227 A1 * | 11/2006 | Jeong | 348/723 |

FOREIGN PATENT DOCUMENTS

| | | |
|---|---|---|
| CN | 1449625 A | 10/2003 |
| JP | 2002-335173 | 11/2002 |
| JP | 2002-344337 | 11/2002 |
| KR | 10-1999-0087757 A | 12/1999 |
| KR | 10-2001-0010109 A | 2/2001 |
| KR | 2001-0064229 | 7/2001 |
| KR | 2003-0071075 | 9/2003 |
| KR | 10-2005-0012531 A | 2/2005 |
| WO | WO 03/017254 A1 | 2/2003 |

* cited by examiner

APPARATUS AND METHOD FOR TRANSFORMING A DIGITAL TV BROADCASTING SIGNAL TO A DIGITAL RADIO BROADCASTING SIGNAL

The present patent application is a non-provisional application of International Application No. PCT/KR2004/002601, filed Oct. 12, 2004.

TECHNICAL FIELD

The present invention relates to an apparatus for transforming a digital television (TV) broadcasting signal into a digital radio broadcasting signal and a method thereof; and, more particularly, to a broadcasting signal transforming apparatus for transforming a transport stream for a digital TV broadcast, such as service information, audio/video transport stream and data transport stream, in conformity to a digital radio broadcasting protocol based on a new radio broadcasting schedule information transmitted from an operator, and a method thereof.

BACKGROUND ART

The currently commercialized digital radio broadcasting or digital multimedia broadcasting provides multimedia service including video, other than audio service.

According to a conventional radio broadcasting service providing method, a program producer produces a content and provides the content to a service provider through a proprietary network and then provides the content to a digital radio broadcasting transmitting network provider through a proprietary network. Herein, there is a problem that the cost for producing a content and using the networks is increased.

That is, in a conventional digital radio broadcasting transmitter, a broadcasting content is produced by a service component provider, i.e., a broadcast content producer and transmitted to a service provider in the form of a unique service component transport interface through a proprietary network, and then it is provided from the service provider to a digital audio transport network provider through a proprietary network. Thus, it requires a program provider, a service provider and a network provider to service a digital radio broadcasting, and a network should be built up between them with a constant supply of contents. For this, cost for producing contents and using networks is required constantly. In particular, the matter of cost becomes more serious to a relatively paltry local digital radio broadcasting service provider.

Meanwhile, in a digital radio broadcasting with more significance on providing a local service relatively, it is desperately needed to provide a high quality multimedia service at a relatively low cost.

These days, satellite, cable, terrestrial wave digital television (TV) broadcastings, which use relatively wide bandwidths, and the satellite multimedia service provides a high-quality multimedia service and since the service coverage is secured, it is undesirable that the high-quality digital TV contents are not applied widely and hoard.

DISCLOSURE

Technical Problem

It is, therefore, an object of the present invention to provide a broadcasting signal transforming apparatus for transforming a transport stream for a digital television (TV) broadcasting, such as service information, audio/video transport stream and data transport stream, in conformity to a digital radio broadcasting protocol based on a new radio broadcasting schedule information transmitted from an operator to thereby reduce cost for producing contents for digital radio broadcasting separately and apply existing high-quality digital TV broadcasting contents, and a method thereof.

Technical Solution

In accordance with one aspect of the present invention, there is provided a broadcasting signal transforming apparatus for transforming digital television (TV) broadcasting signals into digital radio broadcasting signals, which includes: a transport stream generator for receiving and transforming TV broadcasting signals inputted from outside into digital TV broadcasting transport streams; a broadcasting transport format transformer for transforming the digital TV broadcasting transport streams in conformity to a digital radio broadcasting transport protocol and generating digital radio broadcasting transport streams based on a radio broadcasting schedule; a broadcasting multiplexer for multiplexing the digital radio broadcasting transport streams generated in the broadcasting transport format transformer; a modulating/up-converting unit for modulating the digital radio broadcasting transport streams multiplexed in the broadcasting multiplexer in a modulation method for digital radio broadcasting and up-converting frequencies of the modulated radio broadcasting signals into radio frequency (RF) signals; and a high-power amplifier for amplifying the RF signals obtained from modulation and up-conversion in the modulating/up-converting unit to thereby transmit the amplified RF signals through a transmitting antenna.

Also, in accordance with one aspect of the present invention, the broadcasting transport format transformer further includes a storage for storing the digital radio broadcasting data stream outputted from the data broadcasting format transformer, the remultiplexed transport stream outputted from the transport remultiplexer, and the digital radio broadcasting SI stream outputted from the digital radio broadcasting SI carousel transmitter.

In accordance with one aspect of the present invention, there is provided a broadcasting signal transforming method for transforming digital television (TV) broadcasting signals into digital radio broadcasting signals, which includes the steps of: transforming television (TV) broadcasting signals into digital TV broadcasting transport streams; generating digital radio broadcasting transport streams by transforming the digital TV broadcasting transport streams in conformity to a digital radio broadcasting transport protocol based on a radio broadcasting schedule; generating transport streams; multiplexing the generated digital radio broadcasting transport streams; modulating the multiplexed digital radio broadcasting transport streams in a modulation method of digital radio broadcasting; up-converting frequencies of the modulated radio broadcasting signals into radio frequency (RF) signals; and amplifying and transmitting the up-converted RF signals.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter. Also, if it is determined that detailed description on a prior art may blur the point of the present invention, the detailed description will be omitted. Hereinafter, a preferred embodiment of the present invention will be described in detail with reference to the accompanying drawings.

Figure 1:
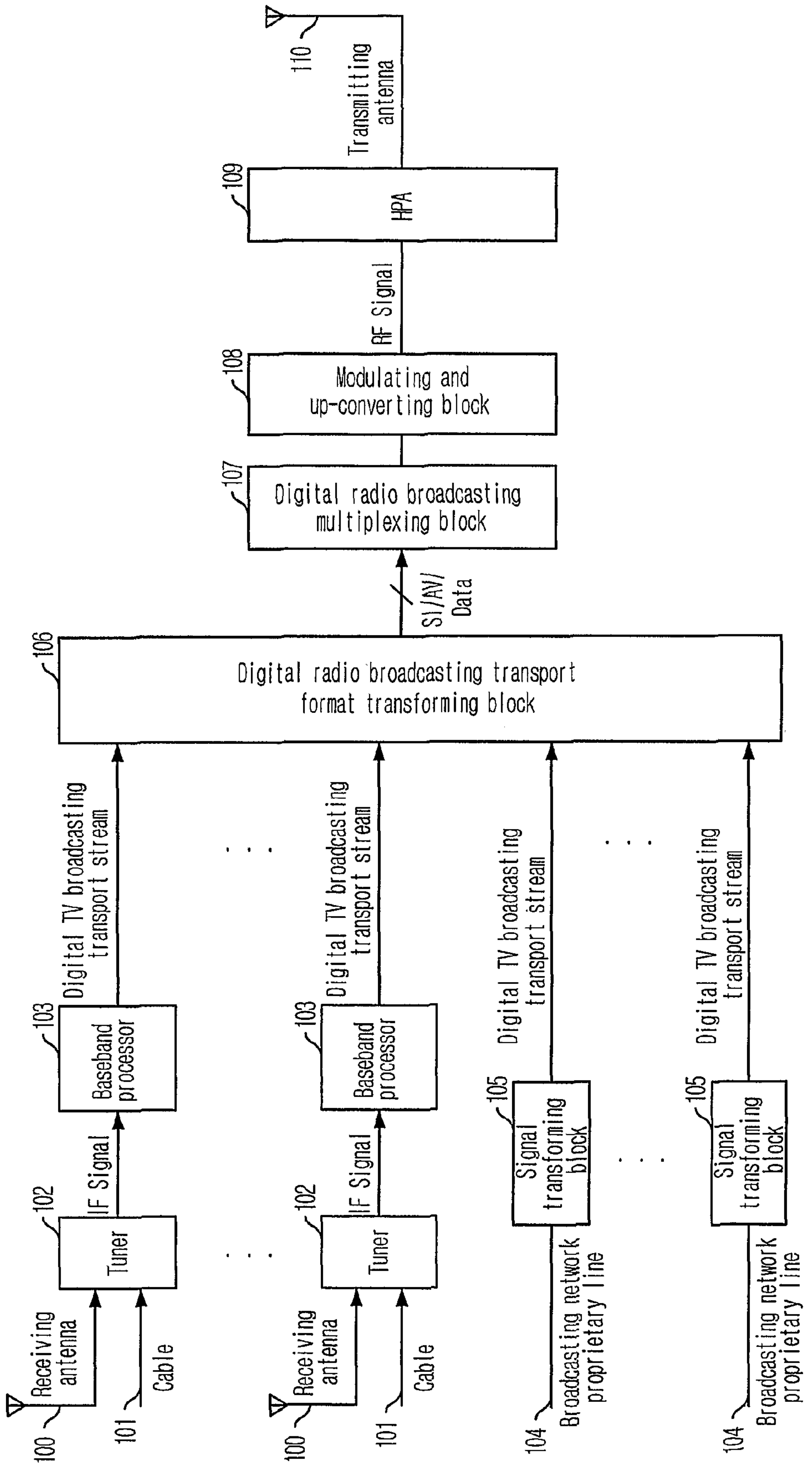
FIG. 1 is a block diagram illustrating a broadcasting signal transforming apparatus for transforming a digital television (TV) signal into a digital radio broadcasting signal in accordance with an embodiment of the present invention.

FIG. 1 is a block diagram illustrating a broadcasting signal transforming apparatus for transforming a digital television (TV) signal into a digital radio broadcasting signal in accordance with an embodiment of the present invention.

When a plurality of tuners 102 select digital television (TV) broadcasting signals of a particular channel among digital TV broadcasting signals inputted through cable 101 and receiving antennas 100 and outputs them in the form of intermediate frequency (IF) analog broadcasting signals, a baseband processor 103 transforms the inputted analog broadcasting signals into digital TV broadcasting transport streams (TS) by digitalizing the IF analog broadcasting signals and performing demodulation.

Meanwhile, a signal transforming block 105 transforms the digital TV broadcasting signals inputted through broadcasting network proprietary line 104 into digital TV broadcasting transport streams.

Herein, the digital TV broadcasting transport streams signify Moving Picture Exports Group 2 (MPEG-2) transport stream which includes audio/video (A/V) data, data broadcasting data, and service information (SI).

Among digital TV broadcasting signals inputted from the outside through cable, receiving antennas, and proprietary lines are digital TV broadcasting signals of the Advanced Television Systems Committee (ATSC), digital TV broadcasting signals of Digital Video Broadcast (DVB), and digital cable TV broadcasting signals of an Open Cable method.

Herein, the digital TV broadcasting signals of the ATSC includes terrestrial wave digital TV broadcasting signals of the ATSC, digital cable TV broadcasting signals of the ATSC, and satellite digital TV broadcasting signals of the ATSC. Meanwhile, the digital TV broadcasting signals of the DVB includes terrestrial digital TV broadcasting signals of the DVB, cable digital TV broadcasting signals of the DVB, and satellite digital TV broadcasting signals of the DVB.

Figure 2:
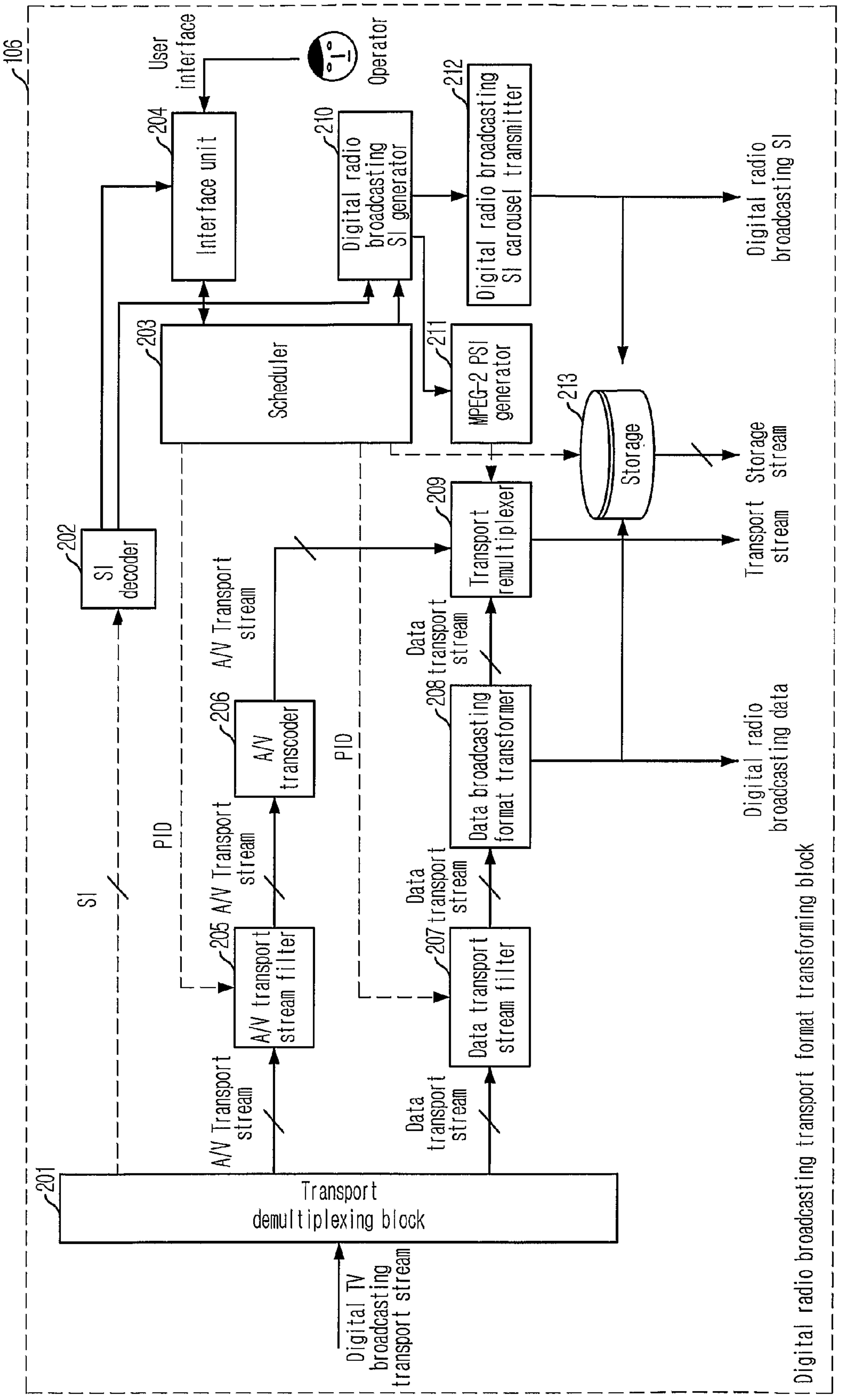
FIG. 2 is a block diagram describing a digital radio broadcasting transport format converting block of FIG. 1 in accordance with an embodiment of the present invention.

Meanwhile, a digital radio broadcasting transport format transforming block 106 transforms the digital TV broadcasting transport streams, which are MPEG-2 transport streams outputted from the baseband processor 103 and the signal transforming block 105 into digital radio broadcasting format (see FIG. 2).

A digital radio broadcasting multiplexing block 107 multiplexes the data transformed in conformity to the digital radio broadcasting transport format in the digital radio broadcasting transport format transforming block 106.

Subsequently, when a modulating and up-converting block 108 modulates the multiplexed data in a digital radio broadcasting modulating method and up-converts them into Radio Frequency (RF) signals, a high-power amplifier 109 amplifies the modulated and up-converted signals and transmits the amplified signals through transmitting antennas 180.

Hereinafter, the operation of the broadcasting signal transforming apparatus of the present invention will be described.

A plurality of digital TV broadcasting signals are received through the receiving antenna 100 and the cable 101 or the proprietary lines 104, and they are transformed into a plurality of digital broadcasting transport streams through the tuners 102, the baseband processors 103 and the signal transforming blocks 105. Then, they are transmitted to the digital radio broadcasting transport format transforming block 106 (see FIG. 2).

The digital radio broadcasting transport format transforming block 106 transforms the received digital broadcasting transport streams into service information (SI) that conforms to the digital radio broadcasting format, audio/video (A/V) information, and data information automatically based on a program schedule of an operator and transmits them to the digital radio broadcasting multiplexing block 107.

Then, the digital radio broadcasting multiplexing block 107 multiplexes the inputted streams, i.e., SI, A/V information, and the data information.

The multiplexed transport streams are modulated into analog intermediate frequency (IF) signals and up-converted into RF signals in the modulating and up-converting block 108. Then, they are amplified in the high power amplifier (HPA) 109 and transmitted through the transmitting antenna 110. Through the above process, digital radio broadcasting is performed.

FIG. 2 is a block diagram describing a digital radio broadcasting transport format converting block of FIG. 1 in accordance with an embodiment of the present invention. It shows a process of transforming the digital TV broadcasting transport stream in conformity to the digital radio broadcasting transport protocol based on the radio broadcasting schedule and generating digital radio broadcasting transport streams.

A transport demultiplexing block 201 demultiplexes the received digital TV broadcasting transport streams into SI transport streams, A/V data transport streams, and data transport streams.

An SI decoder 202 analyzes digital broadcasting service information outputted from the transport demultiplexing block 201 and outputs it to a scheduler 203.

An interface unit 204 generates packet identifier (PID) for programs included in a radio broadcasting schedule and program configuration information, such as Multiplex Configuration Information (MCI) configuration information and label information based on the digital TV broadcasting SI analysis information inputted from the SI decoder 202 and the radio broadcasting schedule inputted by an operator.

That is, the interface unit 204 generates packet identifiers for programs related to digital radio broadcasting programs based on a Program Association Table (PAT) among the digital broadcasting SI analysis information transmitted from the SI decoder 202 with respect to broadcasting programs selected by the operator based on the radio broadcasting schedule.

A scheduler 203 receives the packet identifiers and the program configuration information generated in the interface unit 204, transmits the packet identifiers to an A/V transport stream filter 205 and a data transport stream filter 207, and transmits the program configuration information to a digital radio broadcasting SI generator 210 based on broadcasting time. Also, the scheduler 203 extracts only audio transport streams based on the operator's request (i.e., a request for extracting only audio transport stream) which is transmitted through the interface unit 204 and controls a transport remultiplexer 209 to perform remultiplexing.

The digital radio broadcasting SI generator 210 reconfigures service information for digital radio broadcasting based on the digital TV broadcasting service information transmitted from the SI decoder 202 and the program configuration information transmitted from the scheduler 203.

An MPEG-2 PSI generator 211 defines MPEG-2 Program Specific Information (PSI) based on the service information reconfigured in the digital radio broadcasting SI generator 210 and transmits it to the transport remultiplexer 209.

A digital radio broadcasting SI carousel transmitter 212 transmits the service information reconfigured in the digital radio broadcasting SI generator 210 periodically in a carousel method.

The A/V transport stream filter 205 separates only A/V transport streams corresponding to a packet identifier from an A/V transport stream outputted from the transport demultiplexing block 201 based on the packet identifier transmitted from the scheduler 203 and transmits the A/V transport streams to the transport remultiplexer 209 based on the packet identifiers transmitted from the scheduler 203. Herein, the packet identifier is for a program related to a new radio broadcasting schedule among digital TV broadcasting programs.

An A/V transcoder 206 transforms output signals of the A/V transport stream filter 205, which includes a definition of the video/audio, a data bit rate, and a compression method.

That is, with respect to a radio broadcasting program established in the scheduler 203, the A/V transcoder 206 performs a function of transforming MPEG-2 streams into MPEG-4 streams of a data bit rate, definition and screen size established in the interface unit 204. In case where only an audio broadcasting is transformed, it performs a function of transforming MPEG-2 audio stream into a compression format for digital radio broadcasting.

The data transport stream filter 207 separates only data transport stream corresponding to a packet identifier from a data transport stream outputted from the transport demultiplexing block 201 based on the packet identifier transmitted from the scheduler 203 and transmits the data transport stream to the transport remultiplexer 209 through the A/V transcoder 206.

Figure 3:
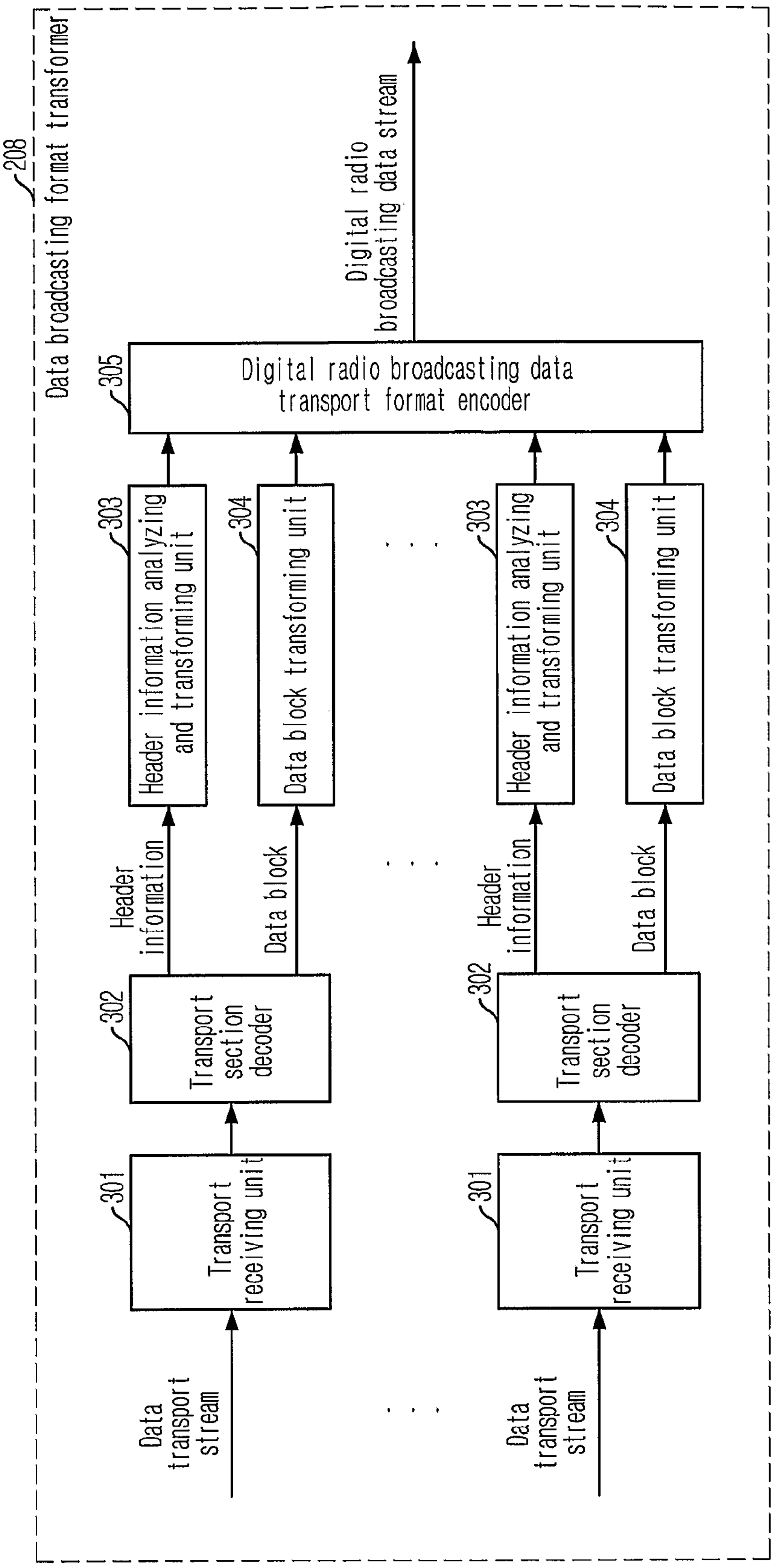
FIG. 3 is a block diagram describing a data broadcasting format transforming unit of FIG. 2 in accordance with an embodiment of the present invention.

A data broadcasting format transformer 208 reconfigures digital TV broadcasting data transport streams, which are outputted from the data transport stream filter 207, into digital radio broadcasting data transport streams that conform to the digital radio broadcasting transport protocol, and transmits the reconfigured digital radio broadcasting data transport streams in a carousel method (see FIG. 3).

The transport remultiplexer 209 remultiplexes a plurality of transport streams. That is, it multiplexes the A/V transport streams outputted from the A/V transcoder 206, the data transport streams outputted from the data broadcasting format transformer 208, and the MPEG-2 PSI outputted from the MPEG-2 PSI generator 211. Herein, the A/V transport streams can be remultiplexed by extracting only audio transport streams based on a control signal from the scheduler 203.

The storage 213 stores the digital radio broadcasting data streams outputted from the data broadcasting format transformer 208, the remultiplexed transport streams outputted from the transport remultiplexer 209, and the digital radio broadcasting SI streams outputted from the digital radio broadcasting SI carousel transmitter 212. The stored streams are outputted based on the control signal from the scheduler 203, which is a control signal based on the request from the operator inputted through the interface unit 204.

Figure 4:
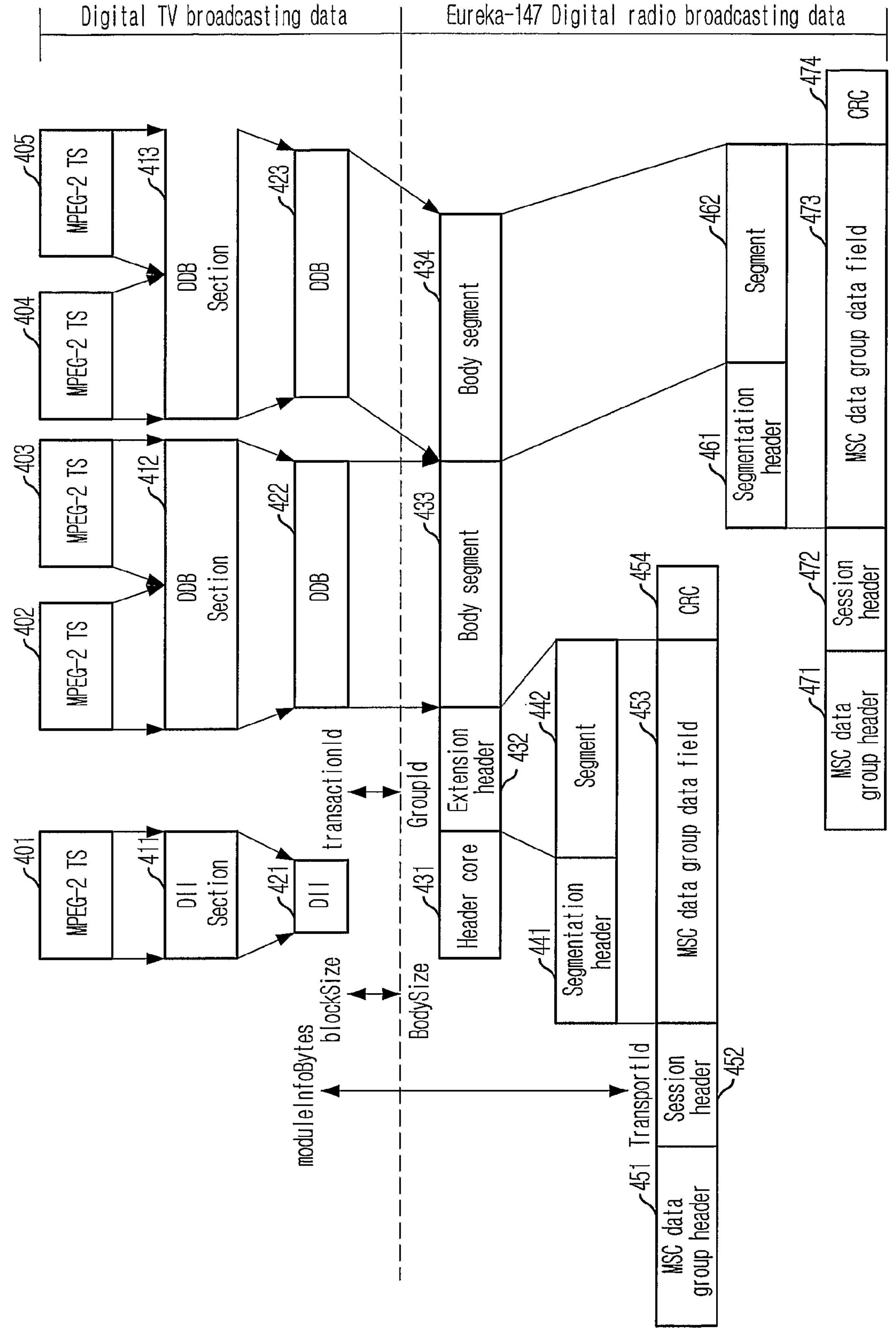
FIG. 4 is a diagram illustrating a data broadcasting format transforming method in the data broadcasting format converting unit of FIG. 2 in accordance with an embodiment of the present invention.

FIG. 3 is a block diagram describing a data broadcasting format transforming unit of FIG. 2 in accordance with an embodiment of the present invention, and FIG. 4 is a diagram illustrating a data broadcasting format transforming method in the data broadcasting format converting unit of FIG. 2 in accordance with an embodiment of the present invention.

With respect to a data broadcasting program selected based on a control signal, which is packet identifier information, from the scheduler 203, the data broadcasting format transformer 208 performs a function of transforming a data download protocol into Multimedia Object Transfer (MOT) protocol in a data service where a section of Digital Storage Media-Command and Control (DSM-CC) is applied to a digital TV broadcasting.

With reference to FIG. 4 first, a method for transforming the data download protocol into a digital radio broadcasting MOT protocol will be described briefly.

As illustrated in FIG. 4, a "moduleInfoBytes" field value for each module is stored in a Download Information Indication (DII) message, which is transmitted through the DSM-CC section, and the number of MOT objects is allocated as many as the number of modules.

Since the allocated MOT objects are discriminated by a transport identifier (TransportId) of a digital radio broadcasting Main Service Channel (MSC) data group, a pre-stored "modleInfoBytes" value is allocated as the "TransportId" value.

The "TransportId" value in the DII message that discriminates a data group from another is inputted to a "GroupId" field of an MOT object header to thereby discriminate a plurality of MOT protocols based on the "GroupId."

Also, a "blockSize" value that represents a block size value in the DII message is inputted to a "BodySize" field in the MOT protocol header to thereby allocate segments of the MOT objects in the same size as the Download Data Block (DDB).

Herein, a method for transforming a digital TV broadcasting data download protocol into an Ereka-147 digital radio broadcasting MOT protocol in the data broadcasting format transformer 208 in a case of a digital radio broadcasting based on the Ereka-147 will be described with reference to FIGS. 3 and 4.

The data broadcasting format transformer 208 transforms a data download protocol of a data broadcasting program selected based on a control signal, which is a packet identifier, from the scheduler 203 into a digital radio broadcasting data transport protocol.

When a transport receiving unit 301 of the data broadcasting format transformer 208 receives a plurality of digital TV broadcasting data transport streams 401 to 405, a transport section decoder 302 separates the received digital TV broadcasting transport streams on a section basis. Then, the transport section decoder 302 generates a DII message 421 and a plurality of DDB 422 and 423 by removing unnecessary information from the separated sections, i.e., by extracting only necessary information, and it separates the generated DII message 421 and the DDB 422 and 423 into a header information block (which is a DII block in FIG. 4) and data blocks 422 and 423 (which are DDB blocks in FIG. 4). Herein, a process of generating the DII message 421 and the DDB 422 and 423 is as follows. The DII message 421 is generated by removing information other than module information ("moduleInfoBytes"), block size ("blockSize"), and transaction identifier ("transactionId") from the DII section 411. The DDB blocks 422 and 423 including actual data are generated by removing 'coupling information when a DDB section is generated by combining a plurality of MPEG transport streams' from the DDB 422 and 423.

The digital TV broadcasting header information is analyzed in the header information analyzing and transforming unit 303 and transformed into header information of the digital radio broadcasting transport protocol. That is, the module information ("moduleInfoByte") data in the header information of the DII message 421 is allocated as a transport identifier ("TransportId") data in the Eureka-147 digital radio data broadcasting, and the transaction identifier ("transactionId") data are allocated as a group identifier ("GroupId") data in the Eureka-147 digital radio data broadcasting, while the block size ("blockSize") data are allocated as a body size ("BodySize") data in the Eureka-147 digital radio data broadcasting.

Therefore, the body size ("BodySize") data are included in a header core 431, and the group identifier ("GroupId") data are included in an extension header 432, while the transport identifier ("TransportId") data are included in session headers 452 and 472 (see FIG. 4).

The data blocks 422 and 423, which are DDB in FIG. 4, are transformed into data blocks 433 and 434 (which are body segments in FIG. 4) of the digital radio broadcasting transport protocol through a data block transforming unit 304.

Hereinafter, a digital radio broadcasting data transport format encoder 305 reconfigures the header information and the data blocks which are transformed in conformity to the digital radio broadcasting transport protocol into digital radio broadcasting data transport streams and outputs the digital radio broadcasting data transport streams through the transport remultiplexer 209 in the carousel transmission method.

Herein, the reconfiguration into the digital radio broadcasting data is carried out as follows.

Each of the header core 431 and the extension header 432 is coupled as one segment 442 with a corresponding header 441 (which is a segmentation header) to thereby form an MSC data group data field 453, and the MSC data group data field is coupled with a session header 452 (which is a part having a "TransportId" field value), an MSC data group header 451, and a Cyclic Redundancy Check Code (CRC) 454, which is an error detecting code, to thereby form an MSC data group.

Each of the body segments 433 and 434 is coupled as one segment 462 with a corresponding header 461 (which is a segmentation header) to thereby form an MSC data group data field 473, and the MSC data group data field 473 is coupled with a session header 472 (which is a part having a "TransportId" field value), an MSC data group header 471, and a CRC 474 to thereby form another MSC data group.

In FIG. 4, since the MSC data group is generated with respect to each of the header core 431, the extension header 432, and the body segments 433 and 434, a total of four MSC data groups are generated in FIG. 4.

Figure 5:
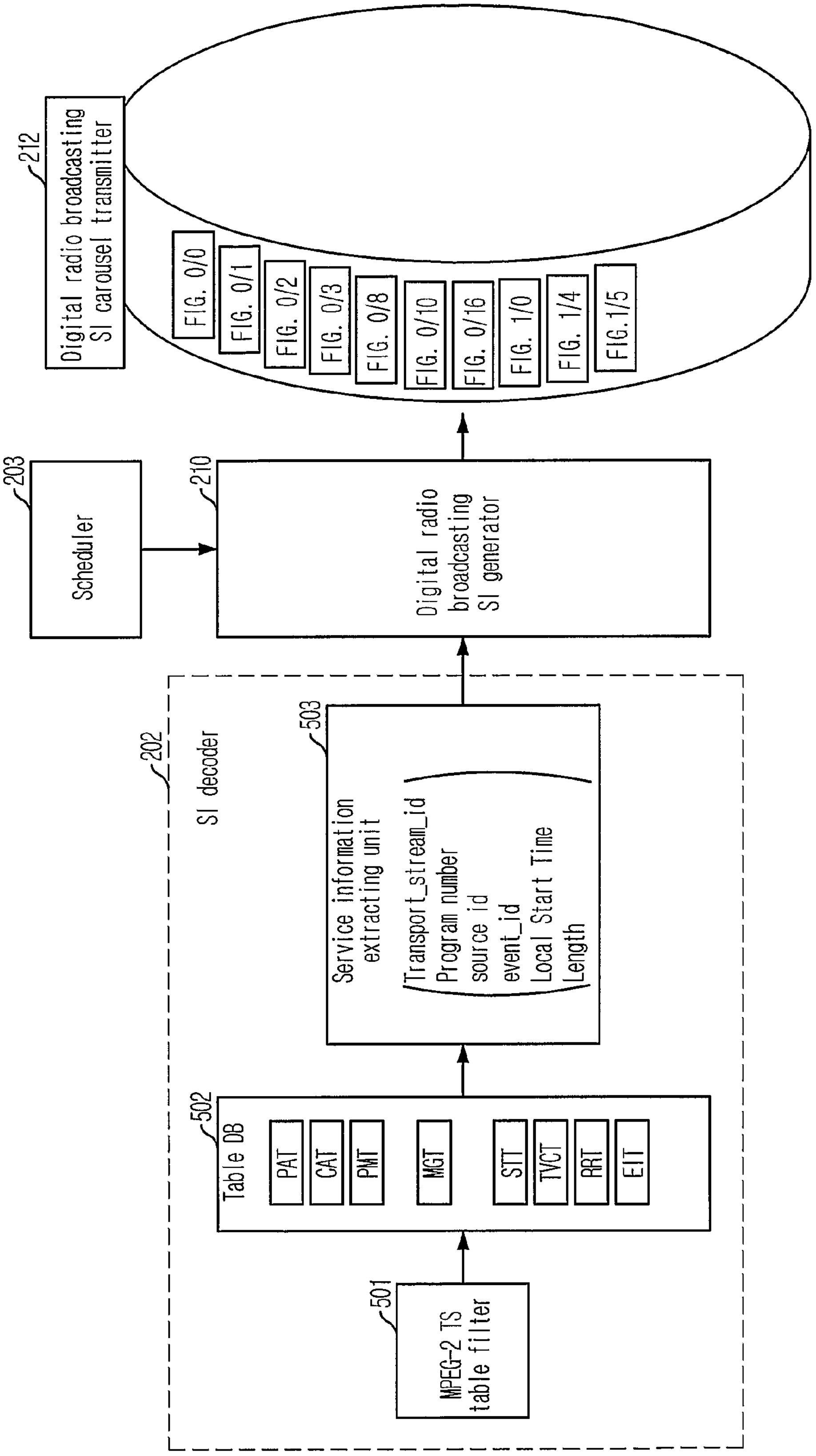
FIG. 5 is a diagram depicting an SI information decoding unit of FIG. 2 in accordance with an embodiment of the present invention.

FIG. 5 is a diagram depicting an SI information decoding unit of FIG. 2 in accordance with an embodiment of the present invention.

The SI decoder 202, as depicted in FIG. 5, includes an MPEG-2 transport stream table filter 501, a table database 502, and a service information extracting unit 503.

The MPEG-2 transport stream table filter 501 analyzes service information inputted from the transport demultiplexing block 201, extracts table information from the service information, and stores the table information in the table database 502. Herein, the table information includes a Program Association Table (PAT), a Conditional Access Table (CAT), a Program Map Table (PMT), a Master Guide Table (MGT), a System Time Table (STT), a Television Virtual Channel Table (TVCT), a Rating Region Table (RRT), and an Event Information Table (EIT).

The service information extracting unit 503 extracts service information, such as a transport stream identifier, a program number, a Universal Time Coordinated (UTC) time information, a program source identifier, an event identifier, a program local start time, a program length, and a program title, from the extracted table information.

Figure 6:
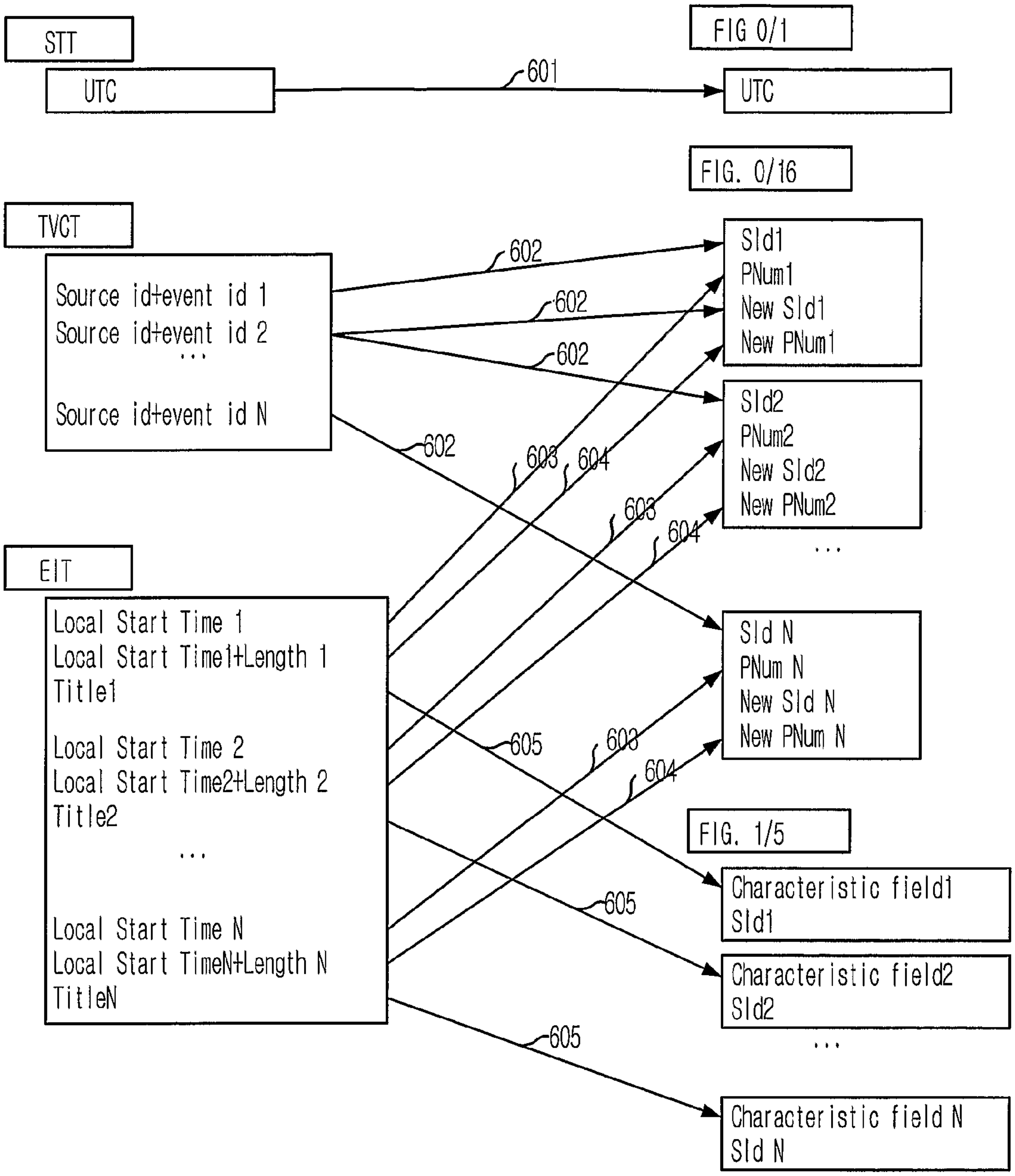
FIG. 6 is a diagram describing a digital radio broadcasting SI generating method in a digital radio broadcasting SI generating unit of FIG. 2 in accordance with an embodiment of the present invention.

FIG. 6 is a diagram describing a digital radio broadcasting SI generating method in a digital radio broadcasting SI generating unit of FIG. 2 in accordance with an embodiment of the present invention. It describes a method for transforming ATSC terrestrial service information into Eureka-147-based digital radio broadcasting service information. Herein, the service information extracted in the SI decoder 202 is transformed to thereby generate digital radio broadcasting service information.

At step 601, the UTC time in the system time table (STT) is directly transformed into UTC time of "Fast Information Group (FIG) type 0 extension type 1" (which will be simply referred to as FIG 0/1 hereinafter).

At step 602, it is directly transformed into new service identifier ("SId") of FIG type 0 extension type 16 (FIG 0/16) by combining the program source identifier of the TVCT with an event identifier. Herein, the "NewSId1," which indicates the next Sid, is the same as "Sid2."

At steps 603 and 604, the program local start time and the program length in the event information table (EIT) are transformed into program number (PNum and new PNum) of the "FIG 0/16." Meanwhile, at step 605, the program title in the event information table is directly transformed into a characteristic field of "FIG 1/5." Herein, although no mapping relations are presented in FIG. 6, the "Sid1," "Sid2," and "SIdN" of the "FIG 1/5" are mapped to a combination of the program source identifier of the TVCT and the event identifier, i.e., "Source id+event id 1."

Meanwhile, other digital radio broadcasting service information except the UTC, the service identifier, the program numbers (PNum and new PNum), and the characteristic field which are to be stored in the "FIG 0/1," "FIG 0/16," and "FIG 1/5" are generated by reconfiguring the program configuration information transmitted from the scheduler 203 based on the Eureka-147 protocol.

In short, service information related to MCI configuration which is to be stored in "FIG 0/0," "FIG 0/2," "FIG 0/3," and "FIG 0/8," service information related to a label which is to be stored in "FIG 1/0" and "FIG 1/4," and service information related to program configuration which is to be stored in other "FIG 0/10" and "FIG 0/16" are generated by reconfiguring the program configuration information transmitted from the scheduler 203 based on the Eureka-147 protocol.

Figure 7:
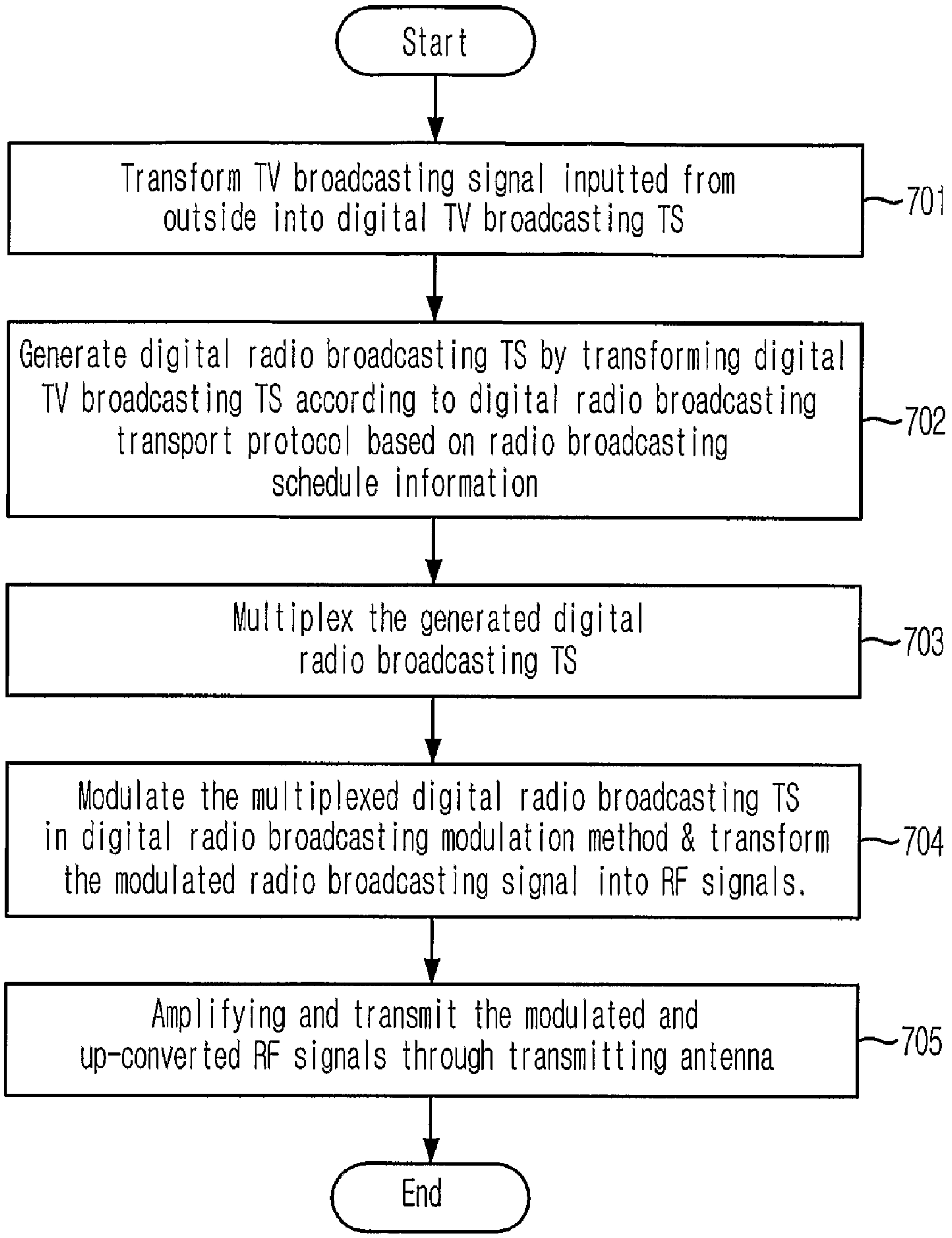
FIG. 7 is a flowchart describing a broadcasting signal transforming method for transforming a digital TV broadcasting signal into a digital radio broadcasting signal in accordance with an embodiment of the present invention.

FIG. 7 is a flowchart describing a broadcasting signal transforming method for transforming a digital TV broadcasting signal into a digital radio broadcasting signal in accordance with an embodiment of the present invention.

Since it is described as the broadcasting signal transforming apparatus for transforming digital TV broadcasting signals into digital radio broadcasting signals, only a general broadcasting signal transforming method will be described hereinafter.

At step 701, the broadcasting signal transforming apparatus for transforming digital TV broadcasting signals into digital radio broadcasting signals receives and transforms TV broadcasting signals inputted from the outside into digital TV broadcasting transport streams. At step 702, it transforms the digital TV broadcasting transport streams in conformity to a digital radio broadcasting transport protocol based on a radio broadcasting schedule to thereby generate digital radio broadcasting transport streams.

Subsequently, at step 703, the broadcasting signal transforming apparatus multiplexes the above generated digital radio broadcasting transport streams and, at step 704, it modulates the multiplexed digital radio broadcasting transport streams in a modulation method for digital radio broadcasting and up-converts the frequency of the modulated radio broadcasting signals into radio frequency (RF) signals.

At step 705, the broadcasting signal transforming apparatus amplifies the modulated and up-converted RF signals and transmits them through a transmitting antenna.

The method of the present invention which is described above can be embodied as a program and stored in a computer-readable recording medium such as CD-ROM, RAM, ROM, floppy disks, hard disks and magnetooptical disks. Since the process can be easily implemented by those of ordinary skill in the art of the present invention, further description on it will not be provided herein.

As described above, the present invention can accommodate high-quality digital TV broadcasting contents while saving cost for producing digital radio broadcasting contents because it can apply existing digital TV broadcasting contents as digital radio broadcasting contents by receiving digital TV broadcasting signals, which are broadcasted currently, through a satellite or cable and transmitting them in the form of digital radio broadcasting signals after transforming them in conformity to the digital radio broadcasting transport protocol.

Also, the present invention can save cost for building up a network for providing new multimedia contents by transforming the digital TV broadcasting signals, which are broadcasted currently, in conformity to the digital radio broadcasting transport protocol, which is different from prior arts that should build up a network between program providers, service providers and network providers to supply contents continuously and provide the digital radio broadcasting.

In addition, the present invention makes the contents shared by many at a low cost by transforming the digital TV broadcasting signals into digital radio broadcasting signals to thereby reducing contents production cost on the part of relatively small local digital radio broadcasting service providers and providing digital radio broadcasting service receivers with high-quality digital TV broadcasting contents which are broadcasted currently.

While the present invention has been described with respect to certain preferred embodiments, it will be apparent to those skilled in the art that various changes and modifications may be made without departing from the scope of the invention as defined in the following claims.

What is claimed is:

1. A broadcasting signal transforming apparatus for transforming digital television (TV) broadcasting signals into digital radio broadcasting signals, comprising:

a transport stream generating means for receiving and transforming TV broadcasting signals inputted from outside into digital TV broadcasting transport streams;

a broadcasting transport format transforming means for transforming the digital TV broadcasting transport streams in conformity to a digital radio broadcasting transport protocol and generating digital radio broadcasting transport streams based on a radio broadcasting schedule;

a broadcasting multiplexing means for multiplexing the digital radio broadcasting transport streams generated in the broadcasting transport format transforming means;

a modulating/up-converting means for modulating the digital radio broadcasting transport streams multiplexed in the broadcasting multiplexing means in a modulation method for digital radio broadcasting and up-converting frequencies of the modulated radio broadcasting signals into radio frequency (RF) signals; and a high-power amplifying means for amplifying the RF signals obtained from modulation and up-conversion in the modulating/up-converting means to thereby transmit the amplified RF signals through a transmitting antenna.

2. The broadcasting signal transforming apparatus as recited in claim 1, wherein the transport stream generating means includes:

a tuning means for selecting digital TV broadcasting signals of a particular channel among digital TV broadcasting signals inputted from outside through an antenna and communication cable and outputting the selected digital TV broadcasting signals in a form of intermediate frequency (IF) analog broadcasting signals; and a baseband processing means for digitalizing and demodulating the IF analog broadcasting signals outputted in the tuning means to thereby transform the IF analog broadcasting signals into digital TV broadcasting transport streams.

3. The broadcasting signal transforming apparatus as recited in claim 1, wherein the transport stream generating means further includes:

a signal transforming unit for transforming TV broadcasting signals inputted from outside through a proprietary line into digital TV broadcasting transport streams.

4. The broadcasting signal transforming apparatus as recited in claim 1, wherein the broadcasting transport format transforming means includes:

a transport demultiplexing means for demultiplexing the digital TV broadcasting transport streams obtained from the transformation in the transport stream generating means into transport streams having digital TV broadcasting service information (SI) and audio/video (A/V) data and transport streams having data;

an SI decoding means for receiving and analyzing the digital TV broadcasting service information transmitted from the transport demultiplexing means;

an interfacing means for generating packet identifiers for programs related to the radio broadcasting schedule and program configuration information based on digital TV broadcasting service information analysis information inputted from the SI decoding means and the radio broadcasting schedule inputted from outside;

a scheduling means for receiving the packet identifiers and program configuration information generated in the interfacing means, transmitting the packet identifiers to an A/V transport stream filtering means and a data transport stream filtering means, and transmitting the program configuration information to a digital radio broadcasting SI generating means based on broadcasting time;

the digital radio broadcasting SI generating means for reconfiguring service information for digital radio broadcasting based on the digital TV broadcasting service information transmitted from the SI decoding means and the program configuration information transmitted from the scheduling means;

a Moving Picture Experts Group 2 (MPEG-2) Program Specific Information (PSI) generating means for defining MPEG-2 PSI based on the reconfigured service information reconfigured in the digital radio broadcasting SI generating means;

a digital radio broadcasting SI carousel transmitting means for transmitting the reconfigured service information reconfigured in the digital radio broadcasting SI generating means in a carousel method periodically;

an A/V transport stream filtering means for separating A/V transport stream corresponding to a packet identifier from the A/V transport stream outputted from the transport demultiplexing means based on the packet identifier transmitted from the scheduling means;

an A/V transcoding means for transforming a definition, a data bit rate and a compression method of audio/video, which are output signals of the A/V transport stream filtering means;

the data transport stream filtering means for separating data transport stream corresponding to a packet identifier from the data transport stream inputted from the transport demultiplexing means based on the packet identifier transmitted from the scheduling means;

a data broadcasting format transforming means for reconfiguring the digital TV broadcasting data transport stream transmitted from the data transport stream filtering means into digital radio broadcasting data transport stream in conformity to a digital radio broadcasting transport protocol;

an MPEG PSI generating means for defining MPEG PSI based on the reconfigured service information reconfigured in the digital radio broadcasting SI generating means; and a transport remultiplexing means for multiplexing the A/V transport stream outputted from the A/V transcoding means, the digital radio broadcasting data transport stream outputted from the data broadcasting format transforming means, and the MPEG PSI defined in the MPEG PSI generating means.

5. The broadcasting signal transforming apparatus as recited in claim 4, wherein the broadcasting transport format transforming means further includes a storing means for storing the digital radio broadcasting data stream outputted from the data broadcasting format transforming means, the remultiplexed transport stream outputted from the transport remultiplexing means, and the digital radio broadcasting SI stream outputted from the digital radio broadcasting SI carousel transmitting means.

6. The broadcasting signal transforming apparatus as recited in claim 5, wherein the scheduling means further performs a function of transmitting a control signal transmitted through the interfacing means based on an external request to the transport remultiplexing means; and the transport remultiplexing means further performs a function of extracting and multiplexing audio transport stream from the A/V transport stream outputted from the A/V transcoding means.

7. The broadcasting signal transforming apparatus as recited in claim 6, wherein the data broadcasting format transforming means includes:

a transport receiving means for receiving a predetermined number of digital TV broadcasting data transport streams outputted from the data transport stream filtering means;

a transport section decoding means for separating the received digital TV broadcasting data transport streams on a section basis and separating the separated sections into header information and a data block;

a header information analyzing and transforming means for analyzing and transforming the separated header information of digital TV broadcasting into header inform of digital radio broadcasting transport protocol;

a data block transforming means for transforming the separated data block of digital TV broadcasting into a data block of digital radio broadcasting transport protocol; and a digital radio broadcasting data transport format encoding means for configuring digital radio broadcasting data transport streams based on the header information and the data block which are transformed in conformity to the digital radio broadcasting transport protocol.

8. The broadcasting signal transforming apparatus as recited in claim 7, wherein in the header transforming process in the header information analyzing and transforming means, in a case where a digital TV broadcasting data download protocol is transformed into a Eureka-147 digital radio broadcasting multimedia object transport (MOT) protocol, data values of module information (moduleInfoBytes), transaction identifier (transactioId), and block size for digital TV broadcasting are allocated as data values for a transport identifier (transported), a group identifier (groupld), and a bodysize of the Eureka-147 digital radio data broadcasting.

9. The broadcasting signal transforming apparatus as recited in claim 8, wherein in the digital radio broadcasting data transport stream configuring process in the digital radio broadcasting data transport format encoding means, an MSC data group data field is configured by coupling each of a header core including the body size data, an extension header including the group identifier (groupld) data, and a data block (body segment) of a digital radio broadcasting transport protocol which is transformed in the data block transforming means with a corresponding segmentation header, and then an MSC data group is configured by coupling each of the MSC data group data fields with a session header having the transport identifier (transportId), an MSC data group header, and an error detecting code.

10. The broadcasting signal transforming apparatus as recited in claim 7, wherein the SI decoding means extracts table information by analyzing service information inputted from the transport demultiplexing means and then extracting a transport stream identifier (Transport_stream_id), a program number, a program source identifier, an event identifier, Universal Time Coordinated (UTC), a program local start time, a program length, and a program title from the extracted table information.

11. The broadcasting signal transforming apparatus as recited in claim 10, wherein the table information includes a Program Association Table (PAT), a Conditional Access Table (CAT), a Program Map Table (PMT), a Master Guide Table (MGT), a System Time Table (STT), a Television Virtual Channel Table (TVCT), a Rating Region Table (RRT), and an Event Information Table (EIT).

12. The broadcasting signal transforming apparatus as recited in claim 11, wherein the SI reconfiguration process in the digital radio broadcasting SI generating means includes:

directly transforming time information of the system time table (STT) into time information of Fast Information Group (FIG) type 1 extension type 1 (FIG 0/1);

directly transforming new service identifiers (SId and newSId) of FIG type 0 extension type 16 (FIG 0/16) by coupling program source information of the TVCT with event information;

transforming the program local start time and the program length of the EIT into programs numbers (PNum and new PNum) of FIG type 0 extension type 16 (FIG 0/16);

transforming the program title into a characteristic field of FIG type 1 extension type 5 (FIG 1/5); and generating service information related to MCI configuration which is to be stored in "FIG type 0 extension type 0 (FIG 0/0)," "FIG type 0 extension type 2 (FIG 0/2)," "FIG type 0 extension type 3 (FIG 0/3)," and "FIG type 0 extension type 8 (FIG 0/8)," label-related service information which is to be stored in "FIG type 1 extension type 0 (FIG 1/0)" and "FIG type 1 extension type 4 (FIG 1/4)," and service information related to program configuration which is to be stored in "FIG type 0 extension type 10 (FIG 0/10)" and "FIG type 0 extension type 16 (FIG 0/16)" by reconfiguring the program configuration information transmitted from the scheduling means based on a Eureka-147 protocol.

13. A broadcasting signal transforming method for transforming digital television (TV) broadcasting signals into digital radio broadcasting signals, comprising the steps of:

transforming television (TV) broadcasting signals into digital TV broadcasting transport streams;

generating digital radio broadcasting transport streams by transforming the digital TV broadcasting transport streams in conformity to a digital radio broadcasting transport protocol based on a radio broadcasting schedule;

generating transport streams;

multiplexing the generated digital radio broadcasting transport streams;

modulating the multiplexed digital radio broadcasting transport streams in a modulation method of digital radio broadcasting;

up-converting frequencies of the modulated radio broadcasting signals into radio frequency (RF) signals; and amplifying and transmitting the up-converted RF signals.

* * * * *